Dec. 2, 1941.  D. W. EXNER  2,265,031
ELECTRONIC REGULATOR
Filed Feb. 16, 1940
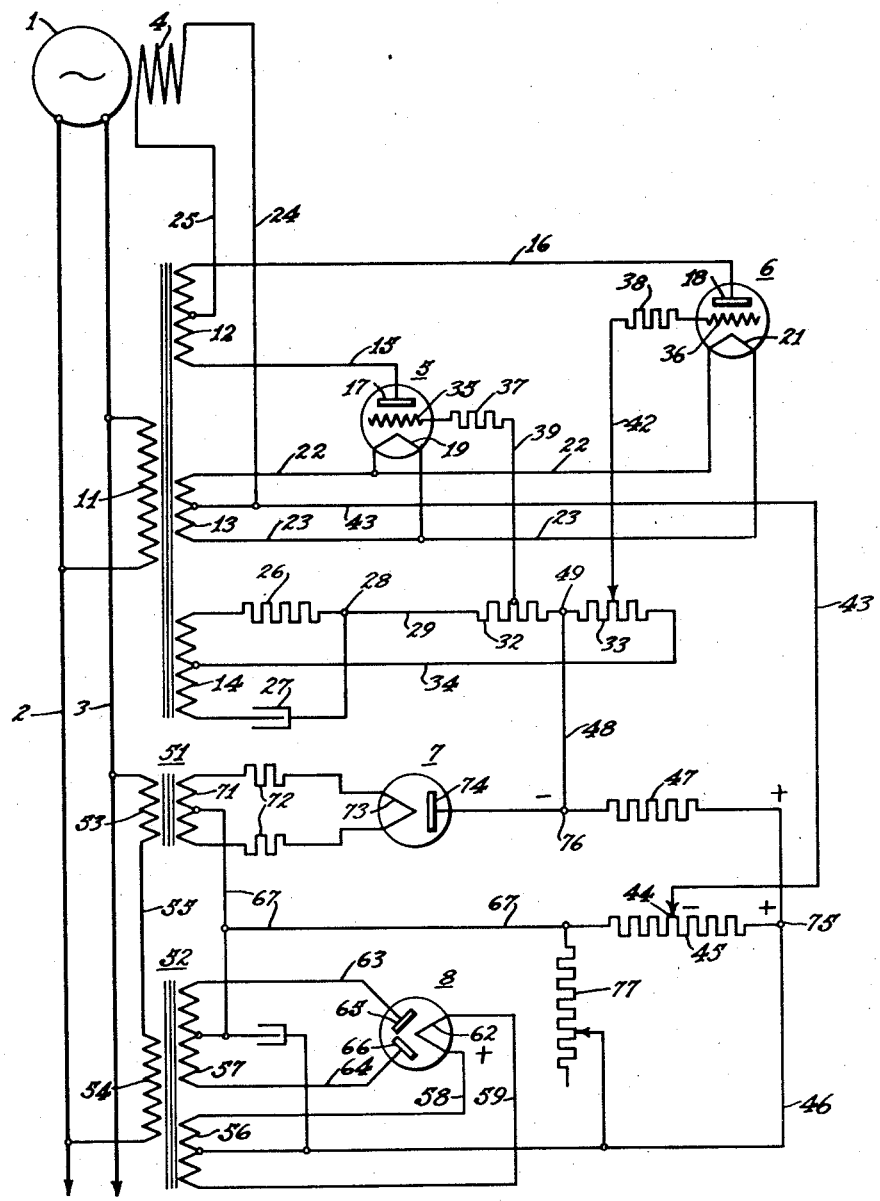
WITNESSES:
E. F. Oberheim.
Wm. C. Greene
INVENTOR
Donald W. Exner.
BY
Franklin E. Hardy
ATTORNEY Patented Dec. 2, 1941

2,265,031

UNITED STATES PATENT OFFICE 2,265,031

ELECTRONIC REGULATOR

Donald W. Exner, Forest Hills, Pa., assignor to Westinghouse Electric & Manufacturing Company, East Pittsburgh, Pa., a corporation of Pennsylvania Application February 16, 1940, Serial No. 319,317

4 Claims. (Cl. 171—119)

My invention relates to a protective circuit for electrical apparatus that has application where two or more devices perform mutually related functions in a system in such manner that failure of one device will cause serious disturbance to the operation of the system if the other devices continue to function normally.

If the several devices are designed and arranged to operate with the same value of alternating current supplied, they may all be connected in series with an alternating-current power source. If such devices are separately supplied from the secondary windings of their several associated transformers, and the primary windings of such transformers are connected in series to an alternating-current source, the loads on the several secondary windings will affect the distribution of the primary voltage across the several primary windings. The respective primary windings will not divide the line voltage of the source equally unless the apparent power taken by the several secondary loads is equal. In accordance with my invention, each transformer must be so designed as to operate on the full line voltage of the alternating-current source without excessive magnetic saturation and the consequent excessive exciting current which would accompany such high saturation. If transformers so designed are connected with their primary windings in series and the load on the secondary winding fails, that is, the secondary winding circuit is open-circuited, the primary of the associated transformer develops a high reactance and greatly diminishes the voltage applied to the primary of the transformers connected in series therewith.

It is an object of the invention to provide a protective circuit for electrical apparatus in which a plurality of load components of a system are supplied from separate transformers, the primary windings of which are connected in series, and the transformers are so designed as to operate upon substantially full line voltage of the source without excessive saturation, so that upon failure of the load on one transformer it will develop a high reactance in series with the other transformers for greatly diminishing the voltage applied thereto.

It is a further object of the invention to provide a protective circuit for an electronic regulator system in which the failure of the voltage responsive tube for governing the voltage output of a regulated generator would normally cause the generator to receive maximum field current.

My invention will be better understood by reference to the accompanying drawing, in which the single figure is a diagrammatic view of apparatus and circuits illustrating a preferred embodiment of the invention.

Referring to the drawing, an alternating-current generator 1 is illustrated having an armature winding connected to supply current to a power circuit represented by conductors 2 and 3, and having a field winding 4 that is connected to be energized from grid-controlled, gas-filled, electronic tubes 5 and 6, which together form a full-wave rectifier unit. The current output of the tubes 5 and 6 is controlled by a detector tube 7 and a full-wave rectifier tube 8 in a manner to be later explained. For the purpose of providing controlled power for the field winding 4, a transformer is provided having a primary winding 11 connected to the power circuit conductors 2 and 3 and secondary windings 12, 13 and 14. The winding 12 serves as an anode transformer, and the opposite ends thereof are connected by conductors 15 and 16, respectively, to the anodes 17 and 18 of tubes 5 and 6. The tubes 5 and 6 are provided with cathodes 19 and 21 that are connected by conductors 22 and 23 to the filament transformer winding 13. The circuit for energizing the field winding 4 extends from the anode transformer winding 12 through conductors 15 and 16, tubes 5 and 6, conductors 22 and 23, filament transformer winding 13, conductor 24, field winding 4, and conductor 25 to the center point of the winding 12.

A phase-shifting network is connected to the transformer winding 14 and comprises a resistor 26 connected to one end of the winding 14 and a capacitor 27 connected to the opposite end of the winding 14, the outer ends of which are joined at a junction point 28, from which a circuit extends through conductor 29, resistors 32 and 33, and conductor 34 to the midpoint of the winding 14. The tubes 5 and 6 are provided with grids 35 and 36 that are connected, respectively, through resistors 37 and 38 and conductors 39 and 42 to selected points along the resistors 32 and 33. The phase-shifting network from the transformer winding 14 introduces an alternating voltage into the grid control circuits of the tubes 5 and 6 through resistors 32 and 33, that is lagging in phase behind the voltage applied to the anode circuit of the tubes. The grid control circuit of the tubes 5 and 6 extends from the cathodes 19 and 21 through conductors 22 and 23, transformer winding 13, conductor 43 to a variable contact member 44 having slidable engagement with a resistor 45, through the right hand portion of the resistor 45, through resistor 47 and conductor 48 to a junction point 49 between the resistors 32 and 33, and then by conductors 39 and 42 to the respective grids 35 and 36.

The detector tube 7 and the rectifier tube 8 are mutually operative to introduce voltage components into the above-traced grid control circuit for the tubes 5 and 6 across resistors 47 and 45. The tubes 7 and 8 are supplied with energy from transformers 51 and 52, respectively, having primary windings 53 and 54 connected in series through a conductor 55 between line circuit conductors 2 and 3. The transformer 52 is provided with a filament transformer winding 56 and with an anode transformer winding 57, the winding 56 being connected by conductors 58 and 59 to the filament 62 of the tube 8, and the outer ends of the winding 57 being connected by conductors 63 and 64 to anodes 65 and 66 of the tube 8. The tube 8 functions as a full-wave rectifier to supply unidirectional current which flows from the cathode 62 through conductors 58 and 59, winding 56, and from the center point of the winding through conductor 46, resistor 45, conductor 67 to the center point of the winding 57, and to the anodes 65 and 66 of the tube 8. The tube 8 thus applies a substantially constant unidirectional potential across the resistor 45, a portion of which is introduced into the grid control circuit of the tubes 5 and 6.

The transformer 51 is provided with a secondary winding 71, the two outer ends of which are connected through resistors 72 to the cathode 73 of the tube 7. The tube 7 serves as a detector tube responsive to the voltage of the generator 1, and controls the flow of current between the anode 74 and the cathode 73 through the resistor 47 in shunt relation to the resistor 45 upon varying conductivity of the tube 7 as caused by variations in its filament voltage. This current flows between conductors 66 and 67 as supplied by the rectifier tube 8.

It will be noted that in the above-traced grid control circuit for the tubes 5 and 6, a positive component of voltage is added across the portion of the resistor 45 between points 44 and 76, and that a negative component is added across the resistor 47. Since the output voltage of the tube 8 remains substantially constant, the voltage across the portion of the resistor 45 included in the grid control circuit remains substantially constant. As the voltage between power circuit conductors 2 and 3 increases above the desired value, the temperature of the cathode 73 of the tube 7 increases rapidly, thus rapidly increasing the conductivity of the tube and permitting a greater current to flow through the tube and through the resistor 47 to increase the voltage drop across the resistor 47, and, therefore, to make the grids 35 and 36 of the tubes 5 and 6 more negative, causing the output current from the tubes 5 and 6 to the field winding 4 to decrease. Similarly, a decrease in the voltage between the line circuit conductors 2 and 3 causes a decrease in the temperature of the cathode 73 and a corresponding decrease in current flow through resistor 47, so that the grids 35 and 36 of the tubes 5 and 6 become more positive and effect an increase in the current flow therethrough to the field winding 4 to increase the voltage output of the generator.

The resistors 72 in circuit with the filament 73 of the tube 7 are not essential, but may be added to increase the load on the transformer 51, if it is desired to load the transformers 51 and 52 equally. Minor adjustments in the load ratio between the two transformers 51 and 52 may be made by a load balancing resistor 77 connected in parallel relation to the resistor 45.

If, during the operation of the electronic regulator above disclosed, the tube 7 should fail, by its filament burning out, or the circuit thereto should become interrupted, the load on the transformer 51 is decreased to zero, and the primary winding 53 becomes a high reactance device in series with the primary winding 54 of the transformer 52, so that both the anode voltage and the cathode voltage are decreased to a very low value, thus causing the voltage drops across resistors 45 and 47 to become zero. As a result, there is substantially no potential difference between the points 44 and 76 in the grid control circuit, and the current passed by the tubes 5 and 6 will then be wholly dependent upon the setting of the phase-shifting circuit from the transformer winding 14, which causes the tubes 5 and 6 to become conductive at some particular point of the anode circuit voltage wave. It will be noted that upon failure of the tube 7, which controls the voltage drop across resistor 47, for introducing a negative bias to the grids of the tubes 5 and 6, these grids would receive a maximum positive potential causing the tubes 5 and 6 to deliver maximum field current to the generator unless the positive component of grid control voltage across the resistor 45 were eliminated from the grid control circuit. Likewise, should the circuit of tube 8 fail for any reason, the potential between points 44 and 76 would disappear or become substantially zero.

It will be apparent to those skilled in the art that modifications in the circuits and apparatus illustrated and described may be made within the spirit of my invention, and I do not wish to be limited otherwise than by the scope of the appended claims.

I claim as my invention:

1. In an electronic regulator, in combination, a control circuit, a pair of mutually related electronic elements for developing control potentials in said control circuit, a pair of electric transformers having their secondary windings connected to supply current to said pair of mutually related electronic elements respectively, and having their primary windings connected in series to an alternating-current source, said transformers being designed to normally operate at sufficiently low flux densities that upon failure of the secondary circuit of either transformer a reactance is developed in the primary circuit thereof that is sufficiently high that the reactive voltage drop across the primary winding becomes substantially the voltage applied to the primary winding circuit.

2. In an electronic regulator, in combination, a control circuit, a pair of mutually related electronic elements for developing control potentials in said control circuit, a pair of electric transformers having their secondary windings connected to supply current to said pair of mutually related electronic elements respectively, and having their primary windings connected in series to an alternating-current source, said transformers being designed to operate at the full voltage of the alternating-current source at a flux density sufficiently low to develop a reactive drop thereacross in the primary circuit that is substantially the applied voltage of the circuit to substantially reduce the voltage across the primary winding of one of said transformers upon a failure in the secondary circuit of the other.

3. In an electronic regulator, in combination, a control circuit, means for introducing control potentials into said control circuit comprising a local circuit network and two electronic devices mutually related for developing controlled potentials across portions of said network, a pair of transformers having their secondary windings connected to supply current respectively to said pair of electronic devices and having their primaries connected in series to an alternating-current supply source, said transformers being designed to normally operate at sufficiently low flux densities that upon failure of the secondary circuit of either transformer a reactance is developed in the primary circuit thereof that is sufficiently high that the reactive voltage drop across the primary winding becomes substantially the voltage of the primary circuit.

4. In an electronic regulator, in combination, a control circuit, means for introducing control potentials into said control circuit comprising a local circuit network and two electronic devices mutually related for developing controlled potentials across portions of said network, one of said devices comprising a source of unidirectional current for the network and the other governing the current flow through a portion thereof, a pair of transformers having their secondary windings connected to supply current respectively to said pair of electronic devices and having their primaries connected in series to an alternating-current source, said transformers being designed to normally operate at sufficiently low flux densities that upon failure of the secondary circuit of either transformer a reactance is developed in the primary circuit thereof that is sufficiently high that the reactive voltage drop across the primary winding becomes substantially the voltage of the primary circuit.

DONALD W. EXNER.